United States Patent
Chang et al.

(10) Patent No.: US 8,274,623 B2
(45) Date of Patent: Sep. 25, 2012

(54) LIQUID CRYSTAL DISPLAY AND METHOD FOR ASSEMBLING THE SAME

(75) Inventors: Chi-Hung Chang, Hsinchu (TW); Ching-Sang Yang, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 310 days.

(21) Appl. No.: 12/698,313

(22) Filed: Feb. 2, 2010

(65) Prior Publication Data

US 2010/0315575 A1    Dec. 16, 2010

(30) Foreign Application Priority Data

Jun. 16, 2009  (TW) ............................... 98120062 A

(51) Int. Cl.
*G02F 1/1333*  (2006.01)
(52) U.S. Cl. .......................................... 349/58
(58) Field of Classification Search ............... 349/58
See application file for complete search history.

(56) References Cited

U.S. PATENT DOCUMENTS

| | | | | |
|---|---|---|---|---|
| 4,519,678 | A * | 5/1985 | Komatsubara et al. | 349/160 |
| 6,774,962 | B2 * | 8/2004 | Yoon | 349/98 |
| 6,835,961 | B2 | 12/2004 | Fukayama | |
| 7,283,185 | B2 * | 10/2007 | Hirakata et al. | 349/58 |

FOREIGN PATENT DOCUMENTS

| | | |
|---|---|---|
| CN | 101245226 | 8/2008 |
| JP | 2005-243572 | 9/2005 |
| TW | I247173 | 12/1990 |
| TW | M271171 | 2/1994 |
| TW | 200628325 | 11/1994 |

OTHER PUBLICATIONS

Chinese language office action dated May 7, 2010.
English language translation of abstract and pertinent parts of JP 2005-243572 (published Sep. 8, 2005).
English language translation of abstract and pertinent parts of CN 101245226 (published Aug. 20, 2008).
English language translation of abstract of TW I247173.
English language translation of abstract of TW 200628325.
English language translation of abstract of TW M271171.

* cited by examiner

*Primary Examiner* — James Dudek
(74) *Attorney, Agent, or Firm* — Thomas, Kayden, Horstemeyer & Risley, LLP

(57) ABSTRACT

An LCD and a method for assembling the LCD are provided. The LCD includes a display assembly and a tape. The display assembly has a top surface, a bottom surface which is opposite the top surface, and a lateral edge connected the edge of the top surface with the edge of the bottom surface. The tape comprises a peripheral portion and a bending portion extending from the peripheral portion. The peripheral portion is utilized to attach to the peripheral area of the top surface, and the bending portion is bended to attach to the lateral edge and the peripheral area of the bottom surface.

16 Claims, 6 Drawing Sheets

LIQUID CRYSTAL DISPLAY AND METHOD FOR ASSEMBLING THE SAME

This application claims the benefit from the priority of Taiwan Patent Application No. 098120062 filed on Jun. 16, 2009, the disclosures of which are incorporated by reference herein in their entirety.

CROSS-REFERENCES TO RELATED APPLICATIONS

Not applicable.

BACKGROUND OF THE INVENTION

1. Field of the Invention

The present invention provides a liquid crystal display (LCD), in particular, a flexible LCD.

2. Descriptions of the Related Art

Due to its advantages, such as its small volume, low profile and low power consumption, liquid crystal displays (LCDs) have been widely applied to various digital electronic products, such as small-sized LCDs adapted to watches, mobile phones and personal digital assistants (PDAs) as well as large-sized LCDs adapted to notebook computers, desktop personal computers (PCs) and the like. As a result, LCDs have now become the mainstream product in the display market.

An LCD mainly comprises a backlight module (including a light source, a light guide component and an optical film) and a liquid crystal panel, which are stacked on each other. Light projected by the light source forms an area light source via the light guide component, and is then imparted with a brightness gain through the optical film and finally forms a picture for display on the liquid crystal panel. Typically, the light source, the light guide component and the optical film are assembled in a frame structure which has a tape attached to the edges thereof.

In reference to both FIGS. 1 and 2, FIG. 1 is a top view of a backlight module 10 in a conventional LCD, and FIG. 2 is a cross-sectional view of FIG. 1 along line A-A'. The conventional backlight module 10 has a light source assembly 11 disposed within a frame 13. The light source assembly 11 generally comprises a light guide plate 111 and an optical film 113 stacked on each other and is attached by a tape 15 at the periphery thereof. The tape 15 delivers a light sheltering effect to provide an appropriate area light source and avoid light leakage at the periphery. The tape 15 may also be a double-sided adhesive tape that can be adhered to the liquid crystal panel (not shown), while the conventional frame 13 is usually made of a rigid and unbendable material to fix and protect the light source assembly 11 installed therein.

Additionally, the conventional light guide plate 111, which is usually injection molded, has a certain thickness and hardness and is unbendable. However, by the advancement in manufacturing processes and the optional use of different light sources, the light guide plate 111 has become increasingly thinner. For example, when the thickness thereof becomes less than 0.3 mm, the light guide plate 111 will become bendable. In this case, the frame 13 undoubtedly becomes the element that has the largest thickness and hardness among all elements of the backlight module 10, so it not only occupies an excessive volume but also renders the backlight module 10 inflexible, which restricts the application of the LCD.

In view of this, it is important to provide a flexible and thin LCD for wider application.

SUMMARY OF THE INVENTION

An objective of the present invention is to provide an LCD and an assembling method thereof which, by using a tape to wrap the display assembly of the LCD, render the display assembly flexible. As a result, the LCD of the present invention can be used in different forms and in more kinds of products, thereby enlarging the application scope thereof.

Another objective of the present invention is to provide a flexible LCD and an assembling method thereof which, by using a tape to wrap the display assembly, eliminate the need of the conventional frame. Consequently, the number of parts in the LCD is reduced and the assembling process is simplified, thereby reducing the production cost of the LCD.

The present invention discloses a liquid crystal display, which comprises a display assembly and a tape. The display assembly has a top surface, a bottom surface opposite the top surface, and a lateral edge connected the edge of the top surface with the edge of the bottom surface, in which each of the top surface and the bottom surface has a peripheral area. The tape has a peripheral portion and a bending portion extending from the peripheral portion. The peripheral portion attaches to the peripheral area of the top surface, and the bending portion is bended to attach to the lateral edge and the peripheral area of the bottom surface.

The present invention further discloses a method for assembling the liquid crystal display, comprising the following steps: providing a display assembly with a top surface, a bottom surface opposite the top surface, and a lateral edge connected the edge of the top surface with the edge of the bottom surface; partially sheltering the top surface of the display assembly by disposing a tape thereon; and partially wrapping the lateral edge and the bottom surface of the display assembly by using the tape.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
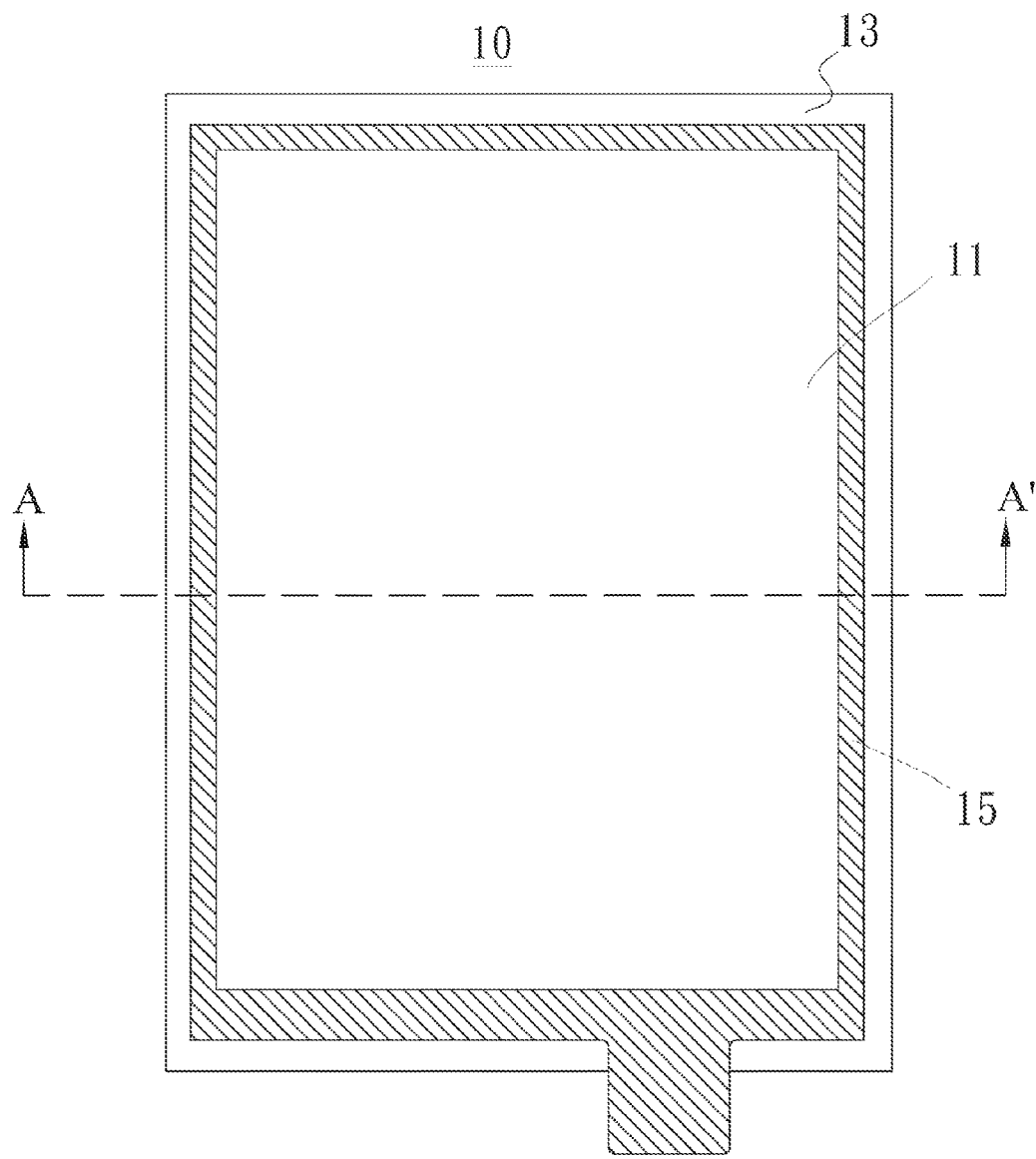
FIG. 1 is a top view of a backlight module of a conventional LCD.
Figure 2:
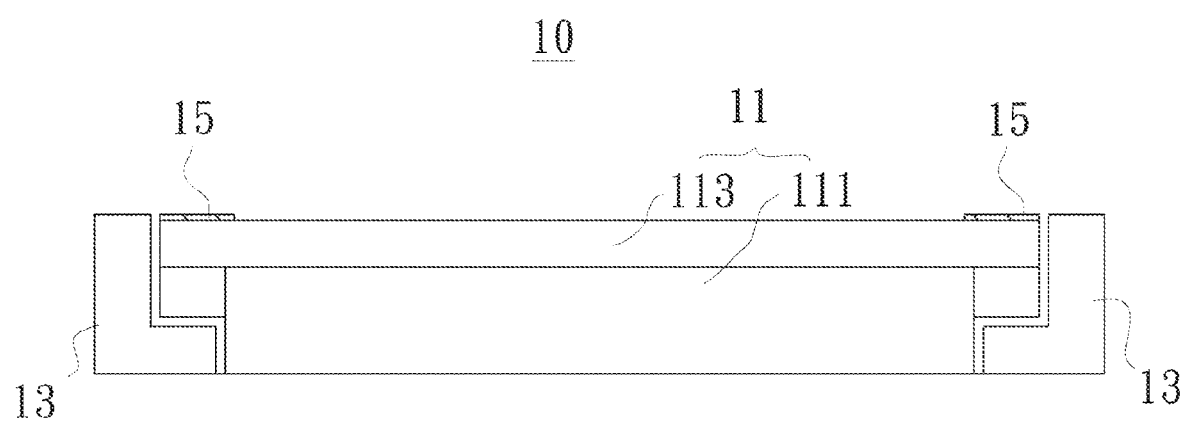
FIG. 2 is a cross-sectional view of FIG. 1 along line A-A'.
Figure 3A:
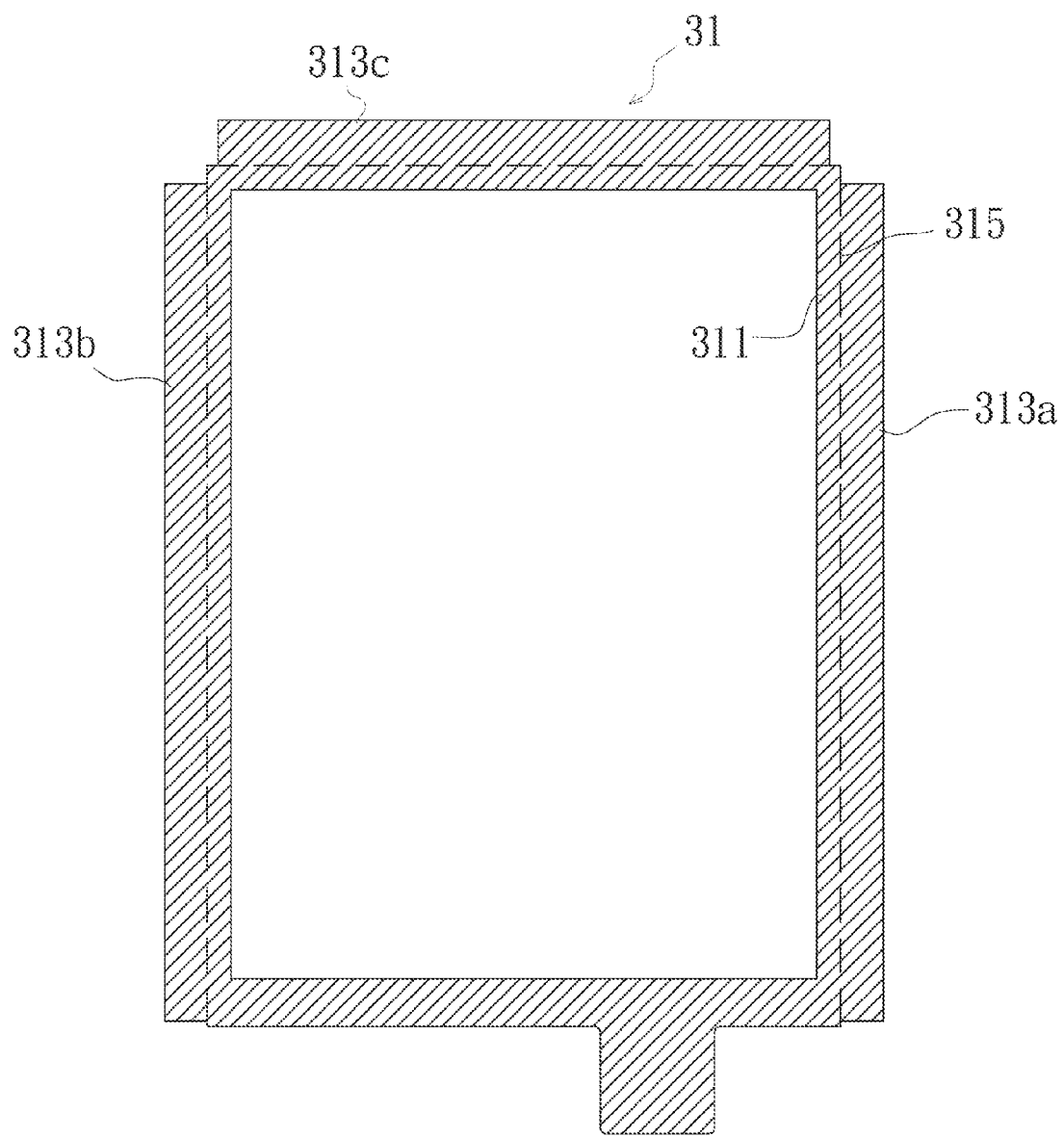
FIG. 3A is a schematic view of a tape of the present invention.
Figure 3B:
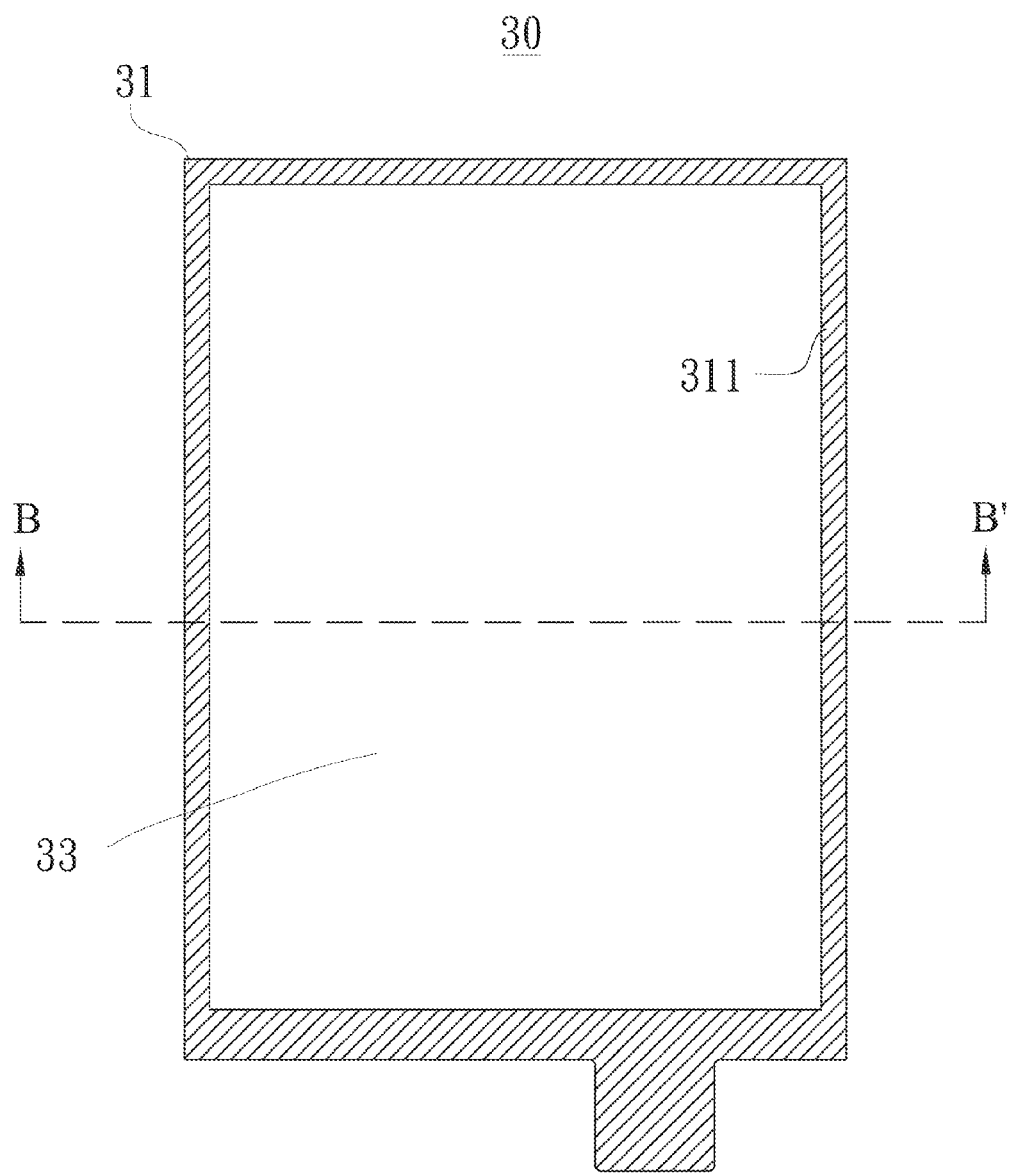
FIG. 3B is a schematic view of an LCD of the present invention.

FIG. 3A illustrates a schematic view of a tape 31, while FIG. 3B illustrates a schematic view of an LCD 30 using the tape 31. Also, in reference to FIG. 4A, a cross-sectional view of FIG. 3B along line B-B' is shown therein to illustrate the first embodiment of the present invention.

Figure 4A:
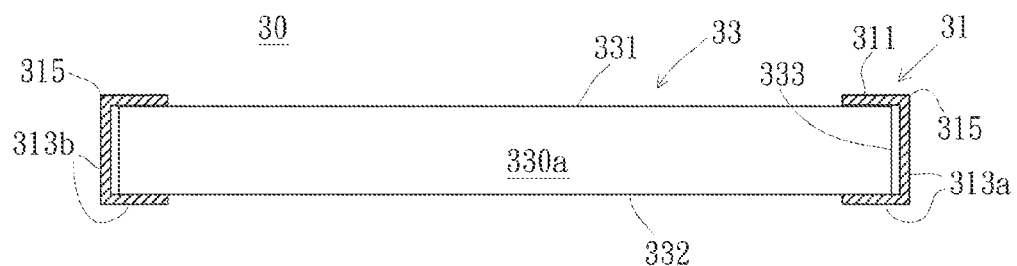
FIG. 4A is a schematic cross-sectional view of the first preferred embodiment of the present invention.

In the first embodiment of the present invention, the LCD 30 comprises a tape 31 and a display assembly 33. The display assembly 33 has a top surface 331, a bottom surface 332 opposite the top surface 331, and a lateral edge 333 connected the edge of the top surface 331 with the edge of the bottom surface 332. The tape 31 comprises a substrate layer and an adhesive layer (not shown), in which the substrate layer may comprise a sheltering layer (not shown) or a reflective layer (not shown). The sheltering layer may be, for example, a black polyethylene terephthalate (PET) film layer adapted to shelter light scattered from the display assembly 33, and the reflective layer may be, for example, an Ag or polycarbonate (PC) layer adapted to reflect light scattered from the display assembly 33 to recycle the light. Alternatively, the substrate layer may comprise both a sheltering layer (not shown) and a reflective layer (not shown), in which the reflective layer is disposed between the sheltering layer and the adhesive layer, i.e., the reflective layer is disposed closer to the display assembly 33 than the sheltering layer to facilitate light reflection. During production, the substrate layer may be prepared first and then coated with an adhesive to form the adhesive layer, although the present invention is not limited thereto. The whole structure of the tape 31 comprises a peripheral portion 311, a bending portion 313 extending from the peripheral portion 311 and a folding line 315 disposed between the peripheral portion 311 and the bending portion 313. Both the peripheral portion 311 and the bending portion 313 attach to the display assembly 33 via the adhesive layer; in more detail, as shown in FIG. 4A, the peripheral portion 311 attaches to the peripheral area of the top surface 331, and the bending portion 313 is bended to attach to the lateral edge 333 and the peripheral area of the bottom surface 332. The peripheral portion 311 prevents light leakage at the peripheral area and ensures that the area light source provided by the display assembly 33 has a shape adapted to be used with the liquid crystal panel.

Furthermore, taking FIG. 4A as an example, the lateral edge 333 of the display assembly 33 comprises at least two opposite side edges, and the bending portion 313 comprises a first bending edge 313a and a second bending edge 313b opposite the first bending edge 313a which operatively attach to the two side edges respectively and are further bent to attach to the peripheral area of the bottom surface 332. In reference again to FIG. 3A, in addition to the first bending edge 313a and the second bending edge 313b opposite each other, the bending portion 313 may further comprise other bending edges, e.g., a third bending edge 313c, to be attached to another side edge of the display assembly 33. The number or distribution of the bending edges may have various forms depending on the specific designs; for example, in addition to the first bending edge 313a, the second bending edge 313b and the third bending edge 313c, the bending portion 313 may further comprise a fourth bending edge (not shown), in which case the tape 31 is shaped as a rectangle with four bending edges wrapping the periphery of the display assembly 33 to provide a desirable structural strength. However, the shape of the tape 31 is not limited herein. It should be appreciated that the display assembly 33 depicted in this embodiment is a backlight module 330a, which is comprised of an optical film, a light guide plate and a reflective plate (not shown) stacked on each other. The optical film is, for example, a diffuser sheet or a prism sheet, and the light guide plate should preferably have a thickness of less than 0.6 millimeters (mm).

Figure 4B:
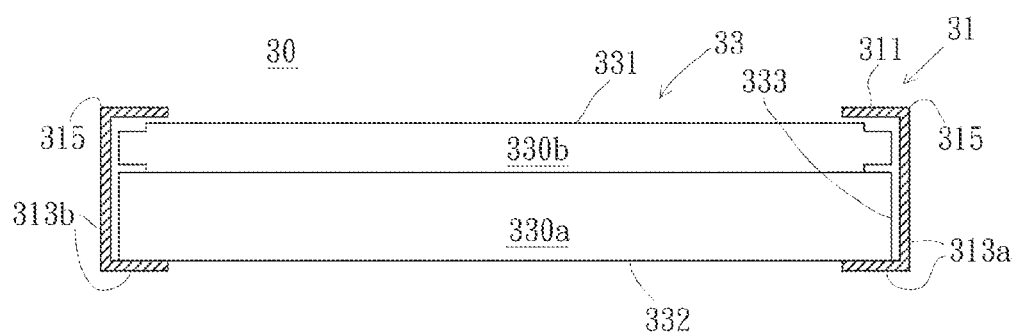
FIG. 4B is a schematic cross-sectional view of the second preferred embodiment of the present invention.
Figure 4C:
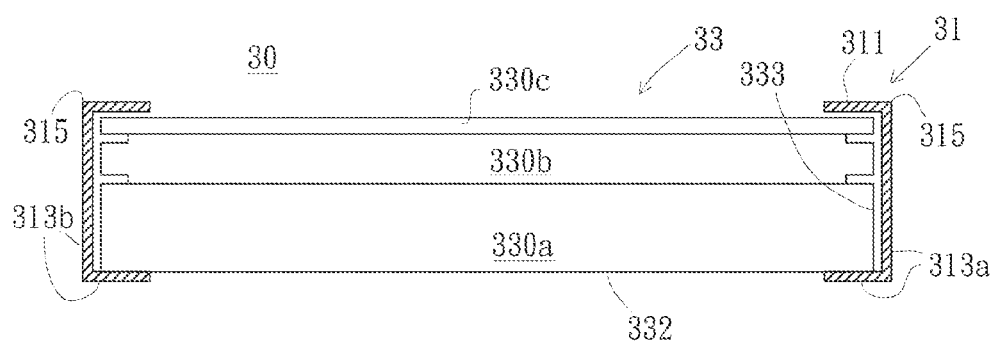
FIG. 4C is a schematic cross-sectional view of the third preferred embodiment of the present invention.

However, the technology of the present invention is not limited to the backlight module. In the second preferred embodiment as shown in FIG. 4B, the display assembly 33 may comprise a backlight module 330a and a liquid crystal panel 330b stacked on each other, in which the liquid crystal panel 330b is disposed on the backlight module 330a and the tape 31 wraps the side edges of the backlight module 330a and the liquid crystal panel 330b. In the third preferred embodiment as shown in FIG. 4C, the display assembly 33 further comprises a protective sheet 330c disposed on the liquid crystal panel 330b opposite the backlight module 330a, and the tape 31 wraps also the side edges formed by the backlight module 330a, the liquid crystal panel 330b and the protective sheet 330c together. The structures of other elements are similar to those of the first embodiment and, therefore, will not be described again herein.

It should be particularly noted that the embodiments shown in FIGS. 4A-4C are only for purposes of illustration, and those of ordinary skill in the art may, under the concepts of the present invention, wrap a plurality of members with the tape 31 to obtain a flexible LCD. The detailed members comprised in the display assembly are not limited in the present invention. For example, in the third preferred embodiment shown in FIG. 4C, the display assembly 33 may further comprise a touch panel (not shown) disposed on the liquid crystal panel 330b opposite the backlight module 330a, i.e., disposed between the liquid crystal panel 330b and the protective sheet 330c, and the tape 31 wraps the side edges formed by the backlight module 330a, the liquid crystal panel 330b, the touch panel (not shown) and the protective sheet 330c together. Alternatively, the protective sheet 330c shown in FIG. 4C may be replaced straightforwardly by the touch panel (not shown), in which case the tape 31 wraps the side edges formed by the backlight module 330a, the liquid crystal panel 330b and the touch panel (not shown) together.

Figure 5:
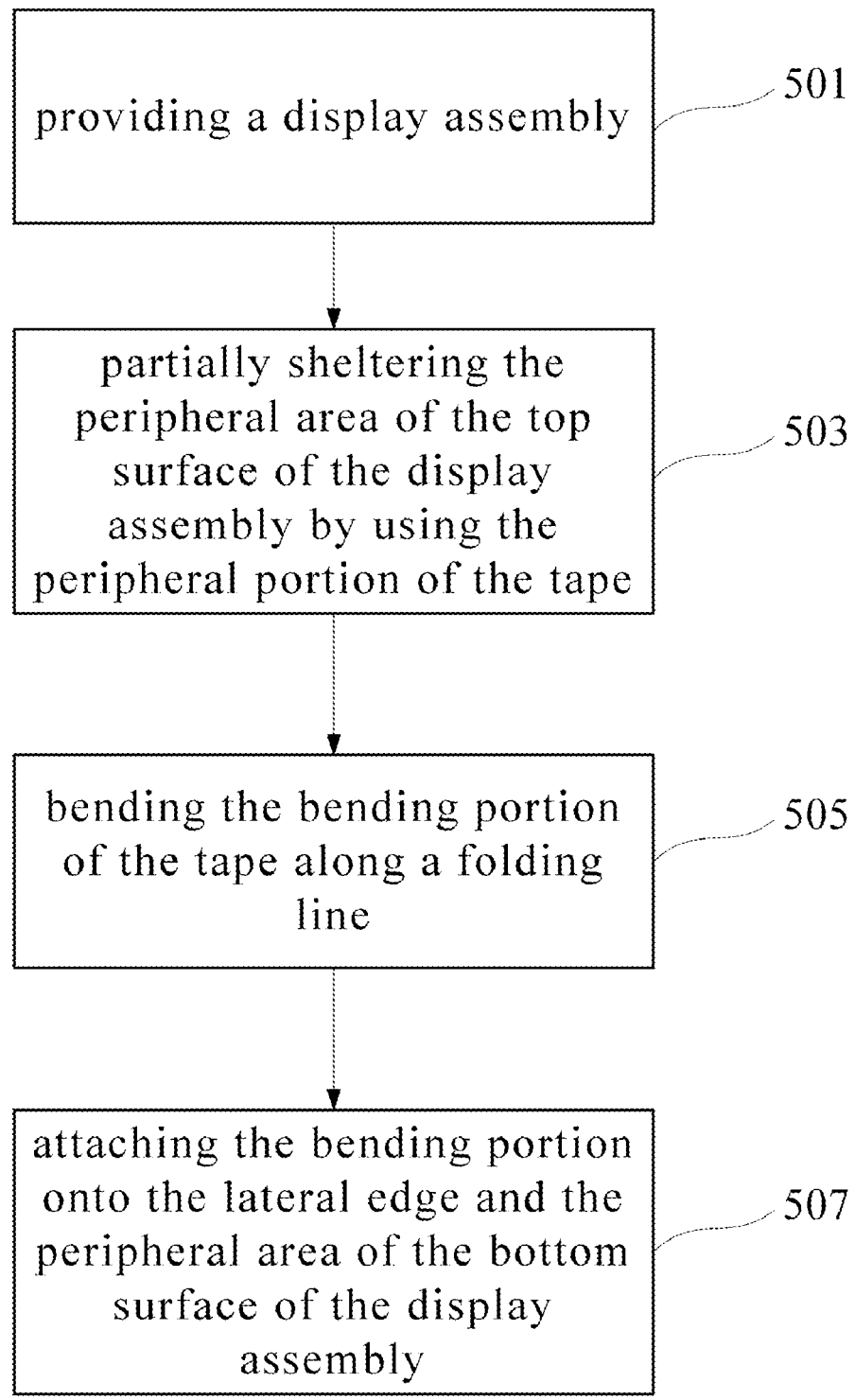
FIG. 5 is a flowchart of an assembling method of the present invention.

In reference to FIG. 5, a method for assembling the aforesaid LCD 30 is disclosed therein, which comprises the following steps. Initially in step 501, a display assembly 33 as described in the aforesaid embodiments is provided. The display assembly 33 may be the backlight module 330a, or may further comprise the liquid crystal panel 330b, the touch panel or the protective sheet 330c. Then, the display assembly 33 is partially sheltered in step 503; in more detail, the peripheral portion 311 of the tape 31 is attached to and partially shelters the peripheral area of the top surface 331 of the display assembly 33. Next, the lateral edge 333 and the bottom surface 332 of the display assembly 33 are partially wrapped by the tape 31; in more detail, the bending portion 313 of the tape 31 is bent along the folding line 315 in step 505, and then the bending portion 313 is attached onto the lateral edge 333 and the peripheral area of the bottom surface 332 of the display assembly 33 in step 507.

According to the above descriptions, the LCD and the method for assembling the LCD disclosed in the present invention replace the frame used in the prior art with a tape to wrap the display assembly of the LCD, thereby rendering the display assembly flexible. Furthermore, the production and assembly of the frame can be eliminated to reduce the production cost of the LCD.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A liquid crystal display, comprising:
a display assembly having a top surface, a bottom surface opposite to the top surface, and a lateral edge connected the edge of the top surface with the edge of the bottom surface, in which each of the top surface and the bottom surface has a peripheral area; and
a tape having a peripheral portion and a bending portion extending from the peripheral portion, the peripheral portion attaches to the peripheral area of the top surface, the bending portion is bended to attach to the lateral edge and the peripheral area of the bottom surface, the peripheral portion and the bending portion both consist of a substrate and an adhesive layer, and the peripheral portion and the bending portion attaching to the display assembly by the adhesive layer;
wherein the display assembly comprises a backlight module, and the tape is at least attached to a side edge and a bottom surface of the backlight module.

2. The liquid crystal display as claimed in claim 1, wherein the tape further comprises a folding line, which is disposed between the peripheral portion and the bending portion.

3. The liquid crystal display as claimed in claim 1, wherein the lateral edge of the display assembly comprises two opposite side edges, and the bending portion comprises a first bending edge and a second bending edge opposite to the first bending edge operatively attaching to the two side edges respectively.

4. The liquid crystal display as claimed in claim 1, wherein the substrate comprises a sheltering layer.

5. The liquid crystal display as claimed in claim 1, wherein the substrate comprises a reflective layer.

6. The liquid crystal display as claimed in claim 1, wherein the substrate comprises a sheltering layer and a reflective layer, the reflective layer being disposed between the sheltering layer and the adhesive layer.

7. The liquid crystal display as claimed in claim 1, wherein the tape is formed with a configuration of rectangle.

8. The liquid crystal display as claimed in claim 1, wherein the display assembly further comprises a liquid crystal panel disposed on the backlight module.

9. The liquid crystal display as claimed in claim 8, wherein the display assembly further comprises a protective sheet or a touch panel disposed on the liquid crystal panel opposite to the backlight module.

10. The liquid crystal display as claimed in claim 1, wherein the backlight module comprises an optical film, a light guide plate and a reflective plate which are stacked.

11. The liquid crystal display as claimed in claim 10, wherein the light guide plate has a thickness less than 0.6 mm.

12. A method for assembling a liquid crystal display, comprising:
providing a display assembly having a top surface, a bottom surface opposite to the top surface, and a lateral edge connected the edge of the top surface with the edge of the bottom surface;
partially sheltering the top surface of the display assembly by disposing a tape thereon, wherein the tape comprises a peripheral portion and a bending portion extend from the peripheral portion;
partially wrapping the lateral edge and the bottom surface of the display assembly by using the tape;
attaching the peripheral portion to a peripheral area of the top surface;
bending the bending portion; and
attaching the bending portion onto the lateral edge and a peripheral area of the bottom surface;
wherein the display assembly comprises a backlight module, and the tape is at least attached to a side edge and a bottom surface of the backlight module.

13. The method as claimed in claim 12, wherein the tape further comprises a folding line disposed between the peripheral portion and the bending portion, and the step of bending is:
bending the bending portion along the folding line.

14. The method as claimed in claim 12, wherein the peripheral portion and the bending portion both consist of a substrate and an adhesive layer, and the step of attaching the bending portion is adhering the adhesive layer of the peripheral portion and the bending portion to the display assembly.

15. The method as claimed in claim 12, wherein the step of providing a display assembly comprises:
providing a backlight module and a liquid crystal panel disposed on the backlight module.

16. The method as claimed in claim 15, wherein the step of providing a display assembly further comprises:
providing a protective sheet or a touch panel on the liquid crystal panel opposite to the backlight module.

* * * * *